United States Patent [19]
Ewald, Jr.

[11] 3,773,014
[45] Nov. 20, 1973

[54] FISH FARM

[76] Inventor: Herbert J. Ewald, Jr., P.O. Box 1167, Karnes City, Tex. 78118

[22] Filed: Mar. 7, 1972

[21] Appl. No.: 232,439

[52] U.S. Cl. .................................................. 119/3
[51] Int. Cl. .................................................. A01k 61/00
[58] Field of Search ........................... 119/2, 3, 4, 5

[56] References Cited
UNITED STATES PATENTS

| | | |
|---|---|---|
| 976,242 | 11/1910 | Wohlfahrt .................... 119/5 |
| 3,192,899 | 7/1965 | Lucey et al. ................. 119/4 |
| 3,166,043 | 1/1965 | Castillo ...................... 119/3 |
| 1,956,524 | 4/1934 | Byram ........................ 119/5 X |
| 3,025,831 | 3/1962 | Berardi ....................... 119/2 |
| 3,351,328 | 11/1967 | Vetterli ...................... 119/5 X |

*Primary Examiner*—Hugh R. Chamblee
*Attorney*—W. F. Hyer et al.

[57] ABSTRACT

There is disclosed a fish farm comprising a tank having a plurality of chambers arranged one above the other and means including a pump for continuously circulating water through the chambers.

20 Claims, 10 Drawing Figures

PATENTED NOV 20 1973 3,773,014

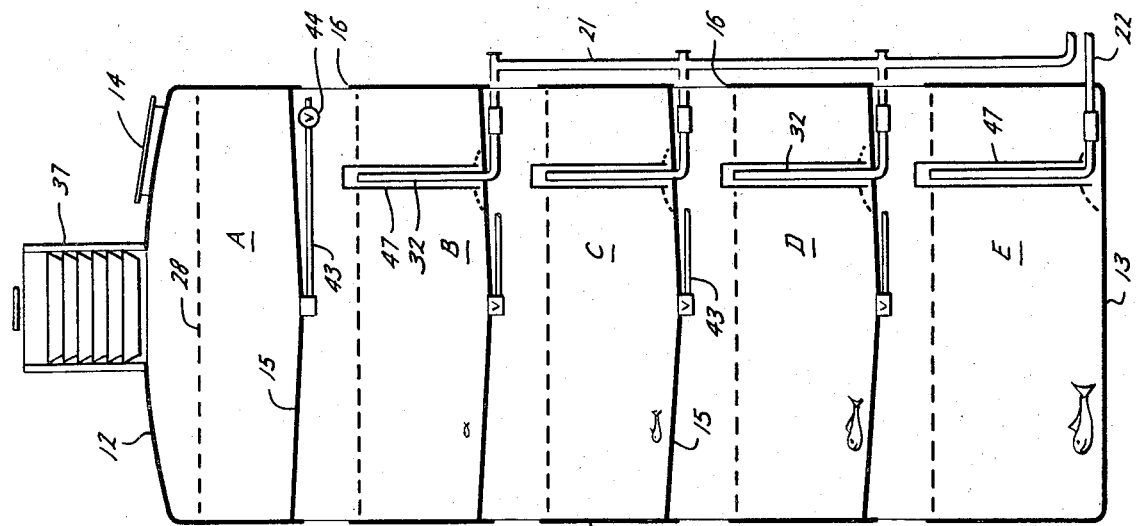
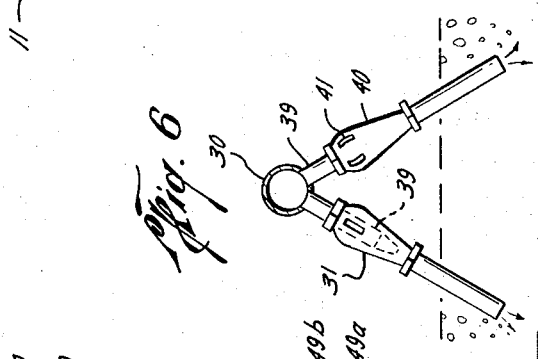
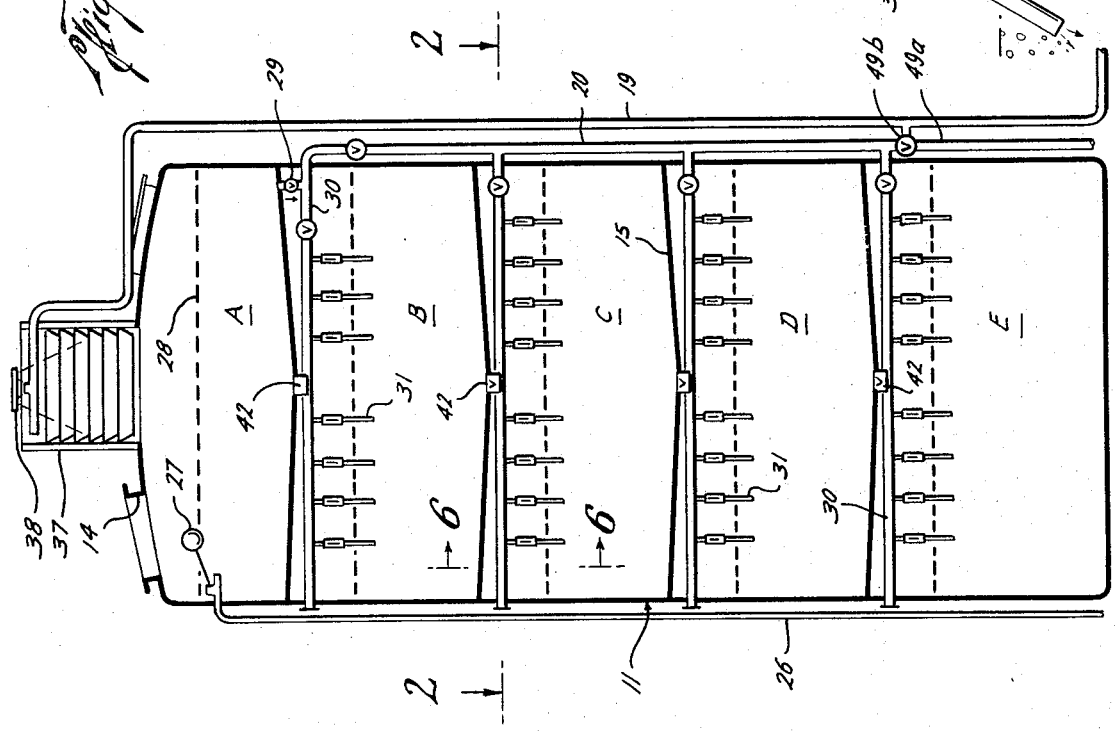

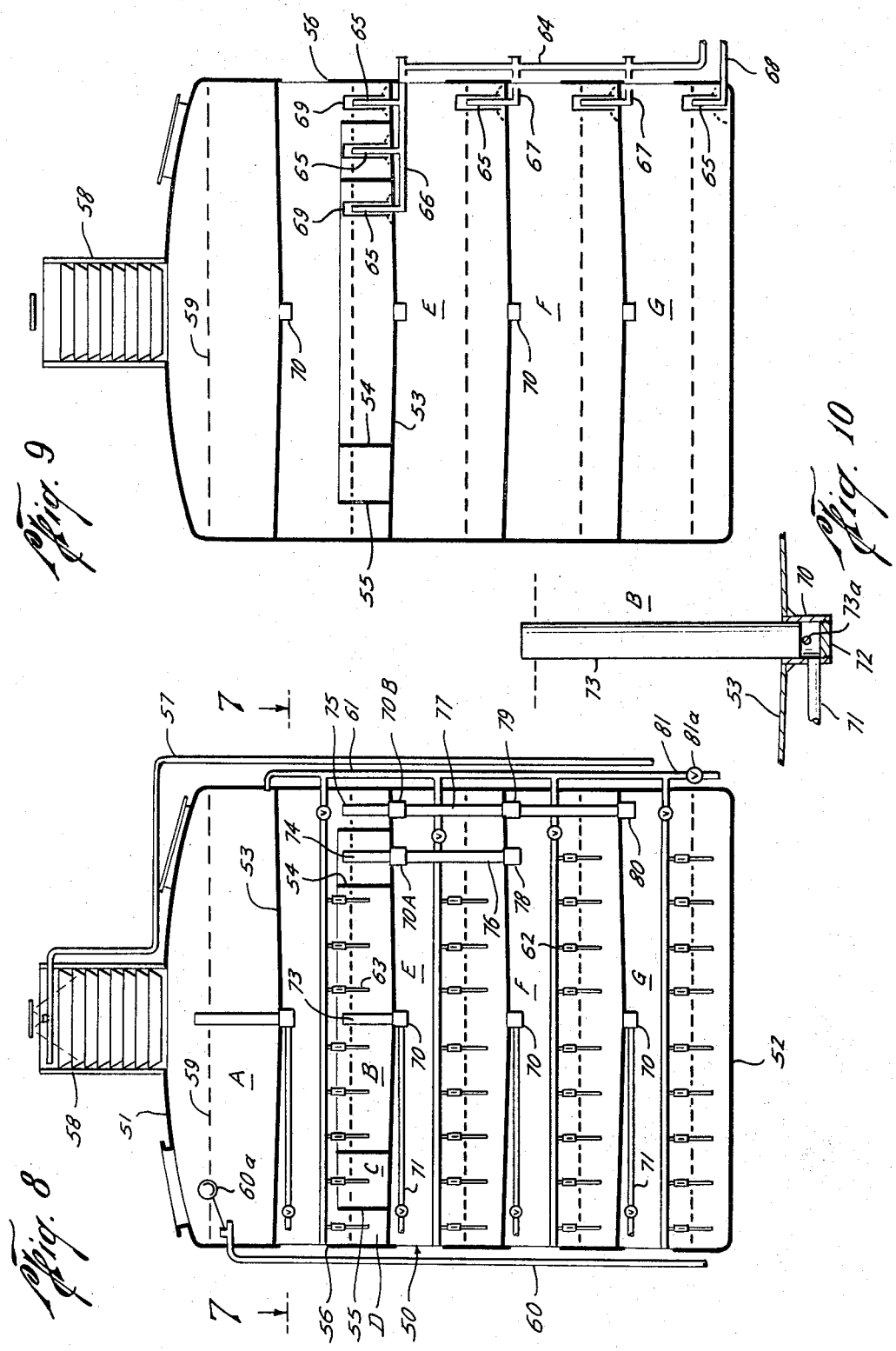

FISH FARM

This invention relates generally to improvements in farms for raising fish on a commercial basis and under controlled environmental conditions. As used herein, the term "fish" includes not only vertabrates, but also shellfish such as shrimp.

It is common practice to raise fish, and primarily catfish, in large outdoor ponds, which, whether natural or man-made, require a substantial investment in land and provide little or no control over many adverse environmental conditions. Also, fish raised in ponds must be fed and otherwise treated as a whole, which is undesirable because of size and age differences. Still further, it is extremely difficult to harvest fish from a pond, especially when the harvest is to be of a selected size and age of the fish.

In order to provide better environmental controls, it has been proposed to raise fish in so-called farms having individual tanks arranged within an enclosure of some type. In this way, the water temperature may be controlled and the fish may be selectively fed and harvested based on their size and age. More particularly, it has been proposed to circulate water through the tanks from a common source and to filter excess food and droppings therefrom, whereby the water may be recirculated. This not only improves the oxygen content of the water, but also minimizes the size and cost of operation of the equipment of the farm.

Although such fish farms have these and other obvious advantages over the use of ponds, they nevertheless have several shortcomings, such as the bulk and weight of the tanks, which must be assembled at the point of use, and complicated arrangements for removing excess food and droppings. Lucey et al. U.S. Pat. No. 3,192,899 discloses a farm in which shellfish are stored in trays which are stacked one above the other, with water being circulated from each tray to one beneath it through overflow perforations in the trays. Although this arrangement reduces the size and bulk of the farm, it apparently would require assembly at the location of use. Also, it provides no convenient way for removing excess food and droppings, or harvesting fish or otherwise treating the contents of any of the trays without shutting down the entire farm.

An object of this invention is to provide a fish farm which may be assembled at the factory to permit it to be transported as a whole to the location of use, and then put into operation with a minimum of start-up.

Another object is to provide a fish farm in which the fish are stored in separate chambers one above the other, but in which individual chambers may be isolated from the remainder to permit them to be cleaned and to permit fish stored therein to be harvested without shutdown of the farm.

Still another object is to provide a fish farm in which fish stored in separate chambers one above the other may be easily and quickly transferred as a group from one to the other, as may be desirable during their growth.

Yet another object is to provide a fish farm having a simple and inexpensive arrangement for aerating the water.

A further object is to provide a fish farm having a simple and inexpensive arrangement for removing excess food and droppings.

A still further object is to provide a fish farm which may be kept in operation even upon failure of the circulating pump.

These and other objects are accomplished, in accordance with the illustrated embodiments of the invention, by a fish farm comprising an upright tank which is divided into an upper chamber and a plurality of lower chambers, means including a pump for delivering water to the upper chamber, means for conducting water from the upper chamber to each of the lower chambers, means for returning water from each of the lower chambers to a filter leading to the pump, and means for maintaining a desired level of water in each chamber. More particularly, a means is provided for interrupting the delivery of water to selected ones of the lower chambers, whereby they may be individually harvested, cleaned, or otherwise treated without interrupting circulation of water through the other chambers. For this purpose, access is provided to each chamber through openings in the side of the tank, and means are provided for draining water from each chamber through such opening.

In the use of my fish farm, the fish are ordinarily stored in only the lower chambers, with the small fish preferably being stored in the uppermost lower chamber and fish of successively greater size and age being stored in successively lower chambers. In this manner, the fish may be fed by age and size, and, if desired, harvested at any stage of development. More particularly, at least certain of the lower chambers are provided with valve-controlled sumps in their bottom walls for dumping their contents directly into a chamber beneath it, whereby the fish may be transferred as a group upon reaching a certain age and size.

In one embodiment of the invention, which is especially well adapted for raising catfish, all of the lower chambers are arranged vertically above one another. However, in another embodiment of the invention, which is especially well adapted for raising shrimp, some of the lower chambers are arranged on the same horizontal level. In this latter embodiment, the sumps for dumping the contents of the horizontally arranged lower chambers connect directly with lower chambers on different vertical levels beneath them.

Water is conducted to each lower chamber by a header which has jets extending downwardly from it and below the water level in that chamber. Preferably, the headers extend into the chambers from a downpipe extending downwardly from the upper chamber. In any case, the upper chamber not only provides a large surface area of water for aeration purposes, but also establishes a large head which increases the force with which water is expelled from the jets so as to further promote aeration of the water, with the extent of aeration being greatest in the lowermost chamber which normally contains the larger fish which need it the most.

Water is returned from each lower chamber to the pump by means of a level control pipe mounted on the bottom wall of the chamber, with all such pipes except that mounted in the lowermost chamber leading to a downpipe connecting with the pump. More particularly, each such pipe is surrounded by another pipe whose upper end extends above the water level and whose lower end has holes therein of a size to pass only small particles, such as excess food and droppings. Consequently, suction within the level control pipe will cause these particles to be drawn through the holes, up the annulus between the pipes, and down the level control pipe to the filter upstream of the pump.

In the drawings, wherein like reference characters are used throughout to designate like parts:

FIG. 4 is a vertical sectional view of the tank, as seen along broken line 4—4 of FIG. 2;

FIG. 5 is a vertical sectional view of the tank, as seen along broken line 5—5 of FIG. 2;

FIG. 6 is an enlarged side view of the aerating jets extending downwardly from a header within one of the chambers of the tank, as seen along broken line 6—6 of FIG. 4;

FIG. 8 is a vertical sectional view of the tank of FIG. 7, as seen along broken line 8—8 of FIG. 7;

FIG. 9 is a vertical sectional view of the tank, as seen along broken line 9—9 of FIG. 7; and FIG. 10 is an enlarged sectional view of the valve controlled sump in the bottom wall of one of the chambers of the tank.

Figure 1:
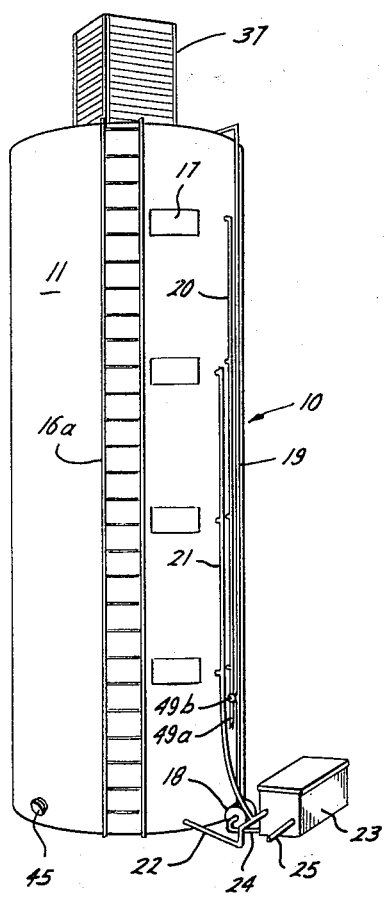
FIG. 1 is a perspective view of a fish farm constructed in accordance with the first-mentioned embodiment of the present invention.

With reference now to the details of the above-described drawings, the fish farm constructed in accordance with the first embodiment of my invnetion, and designated in its entirety by reference character 10, includes an upright tank 11 which is closed at its top and bottom 12 and 13, except for manholes 14 in its top, and which has a plurality of intermediate, generally horizontal walls 15 which divide it into an upper chamber A and successively lower chambers B, C, D, and E, arranged one above the other. A plurality of openings 16 are formed in opposite sides of the tank 11 opposite each of the lower chambers B, C, D, and E, and doors 17 are pivotally mounted on the tank for normally closing the openings. Ladders 16a along the side of the tank permit a person to climb to the level of any of the openings.

The tank is preferably cylindrical in cross section and made of fiberglass. This material is not only light and strong, but also non-porous, so that it won't hold bacteria and can be quickly neutralized in the event the fish are sick.

Water is circulated through the tank by means of a pump 18 (see FIG. 1), a conduit 19 leading from the discharge side of the pump for delivering water to the upper chamber A, conduits including a downpipe 20 connecting the upper chamber with each of the lower chambers B, C, D, and E, and the additional conduits including a downpipe 21 connecting each of the chambers B, C, and D and a single pipe 22 connecting the lower chamber E with a filter 23 leading to the suction side of the pump 18 by means of a conduit 24 (see FIG. 1). The filter may be of any conventional construction for removing the small particles from the water returned from the tank prior to recirculation of the water into the tank, and includes a drain line 25 (see FIG. 1) to permit it to be emptied for cleaning purposes.

The tank 11 and the above-described pump, filter and conduits for recirculating water therethrough are initially filled with water through a conduit 26 extending upwardly along its side for supplying water from a suitable source, such as a city main. Thus, as shown in FIG. 4, the upper end of the conduit 26 extends through the tank into the chamber A, and is adapted to be opened and closed by a conventional float controlled device 27, so that upon filling of the circulating system and the other tanks to a desired level, as described to follow, the chamber A will also fill to the level 28. If course, make-up water, as required, will also be delivered through the conduit 26 to the chamber A, as determined by operation of the level control device 27.

Water is conducted from the upper chamber to each of the lower chambers by means of a conduit 29 extending through the bottom wall 15 of the chamber A for connection with the upper end of the downpipe 20. As shown in FIG. 4, headers 30 extend laterally from the downpipe across the upper end of each of the lower chambers B, C, and D, and aerator jets 31 extend downwardly from each of the headers along the length thereof for emptying water from the header into each chamber below the water level therein. Thus, during filling of the tank, water will flow from the upper chamber A through the downpipe 20, and successively into the lower chambers E, D, C, B, and A to fill them to the levels indicated by the broken lines in FIGS. 4 and 5.

Figure 3:
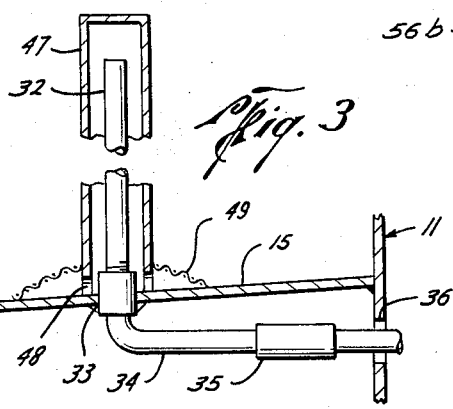
FIG. 3 is an enlarged cross-sectional view of the concentric pipes for returning water from one of the chambers to the pump, as seen along line 3—3 of FIG. 2.

Water in each of the lower chambers is caused to flow into the return downpipe 21 and the single line 22 by means of a level control pipe 32 mounted on the bottom wall 14 of such chamber. More particularly, and as best shown in FIG. 3, the lower end of the pipe 32 in each chamber except chamber E is connected to a coupling 33 extending through and fixed to the bottom wall 15 thereof. An additional conduit 34 connecting with the lower end of the coupling 33 extends laterally therefrom and through the side wall of the tank 11 for connection with downpipe 21. In the case of chamber E, the conduit 34 connects with the separate pipe 22. More particularly, each laterally extending conduit 34 is formed in two sections which are joined by a flexible tube 35, and the outer section extends through an enlarged hole 36 in the side of the tank. In this manner, the water return conduits are sufficiently flexible to permit heaving of the bottom wall 15 as water is introduced to or removed from the chamber above it. In any event, when water reaches the desired level in each of the chambers, and fills the recirculating conduits, the pump and the filter, the valve in supply line 26 will close, and the pump 18 may be started.

In order to maintain the oxygen content for the catfish at a desired level, the water must be maintained at a temperature not substantially above 80°F. In hot weather, it is therefore desirable to cool the water as it is delivered to upper chamber A by means of a cooling tower 37 mounted on the top 12 of the tank. The cooling tower is of conventional construction, comprising slanted boards arranged so that the water from the delivery conduit 19 flows downwardly over them prior to emptying through the lower end of the tower into the chamber A. As illustrated, a laterally extending portion of the conduit 19 has a discharge nozzle for causing the water to eject against a deflector 38 and thus outwardly against the slanted boards. In colder weather, the upper end of the conduit may be diverted from the tower so as to deliver water directly into the chamber A.

The aerator jets 31 are also of conventional construction comprising, as best shown in FIG. 6, an inner pipe 39 leading from the lower side of the header 30 and surrounded by an outer pipe 40, including an upper enlarged section having slots 41 therein for drawing air into the upper pipe upstream of the lower end of the inner pipe. As previously described, the lower ends of the jets eject water into each of the lower chambers beneath the water level therein, so as to cause additional aeration, as illustrated graphically by the bubbles in FIG. 6. As shown in FIG. 6, the jets diverge from different sides of a vertical plane through the header. They also preferably diverge from different sides of vertical planes transverse to the header, so as to induce a swirling action in the water.

As again previously described, it is contemplated that the fish will be contained in the lower chambers B, C, D, and E, in successively increasing sizes and ages — i.e., the small fish or fingerlings in the chamber B, and the largest sizes of fish in the chamber E. Since the head of water is successively larger in the lower chambers, it will result in successively greater agitation of the water through the aerating jets 31, which in turn is useful in that the larger fish require successively more aeration.

Figure 2:
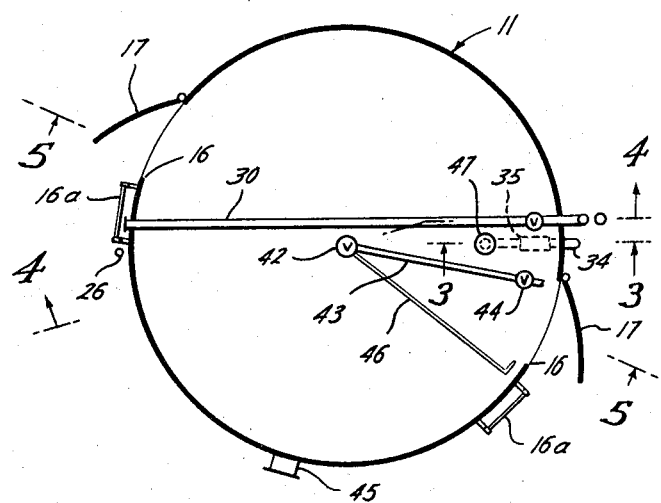
FIG. 2 is a horizontal cross-sectional view of the fish farm of FIG. 1, as seen along broken line 2—2 of FIG. 4.

Sumps 42 are mounted in the centers of the bottom walls 15 of the chambers A, B, C, and D, so that when the walls bend downwardly when filled with water, the sumps will be located at the lowermost points in the chambers. A pipe 43 extends from the side of each sump to a point near the opening 16, and a valve 44 is provided in the outer portion of each pipe so that it is located for ready access upon opening of the door 17. Opening of the valve will therefore permit the contents of selected chambers A–D to be drained. Under normal operation, of course, the valve 44 is closed to maintain the desired level of water within the chamber with which its drain pipe connects. The lowermost chamber E is adapted to be drained through a port 45 in the side of the tank near its bottom 13 (see FIGS. 1 and 2).

As indicated in FIGS. 4 and 5, each of the sumps 42 in the bottom walls of the chambers B, C, and D, is provided with a valve to permit its contents to be dumped from that chamber to the chamber directly beneath it. Thus, the fingerlings within the chamber B may be dumped into the chamber C, the somewhat larger fish in the chamber C may be dumped into the chamber D, and the still somewhat larger fish in the chamber D may be dumped into the chamber E. The valve in each of these sumps may be operated by means of an arm 46 extending to a point near the opening 16, and thus in position for ready operation upon opening of the door 17. The valve may be of conventional construction and operate in a conventional manner, as by swinging of the arm 46 about a vertical axis.

As indicated in FIG. 4, a valve is located in the conduit 29 connecting upper chamber A with downpipe 20, so that if desired, the chamber A may be isolated from the lower chambers to permit its contents to be harvested or drained through drain pipe 43 prior to cleaning. As also indicated in FIG. 4, valves are arranged in each of the headers 30 intermediate their connection with the downpipe 20 and the jets 31, so that each of the lower chambers B, C, D, and E, may be isolated from the other chambers for the same purpose, all without interrupting recirculation of water through the other chambers of the tank.

The level control pipe 32 in each of the lower chambers is surrounded by an outer pipe 47 which is also mounted on the bottom wall of the chamber, but which has an upper end extending above the water level therein. As best shown in FIG. 3, the lower end of the outer pipe 47 has holes 48 therein adjacent the bottom wall of the chamber of a size to permit entry of excess food, droppings and other small particles of trash, but to exclude dead fish. A screen 49 is mounted about the outer pipe and extends between it and the bottom wall of the chamber so as to prevent the fish from laying over the holes 48. As previously described, this construction will actually cause the small particles to be drawn through the holes 48 and up the annulus between the pipes 32 and 47. Normally, dead fish will not be swept toward the screen 49, but will instead seek the lower level of the bottom wall of the chamber, and thus collect in the sump 42, from which they may be removed from time to time during the cleaning of the tank.

The fish farm tank is also rendered substantially fail-safe, in the event of failure of the pump 18 to operate, as in the case of a power failure. For this purpose, a conduit 49a connects with the lower end of the downpipe 20 beneath its connection to the header 30 for the lowermost chamber E. This conduit is adapted to be connected to the city water main or other suitable source of water, and has a normally closed valve 49b which is adapted to be opened automatically in response to failure of the pump 18. The mechanism for opening the valve may be of any suitable construction, and, as will be understood, opening of the valve and delivery of the water upwardly through the downpipe 20 will maintain water in the chambers, and thus prevent the fish from dying, until the power failure or other reasons for malfunction of the pump 18 may be corrected.

Figure 7:
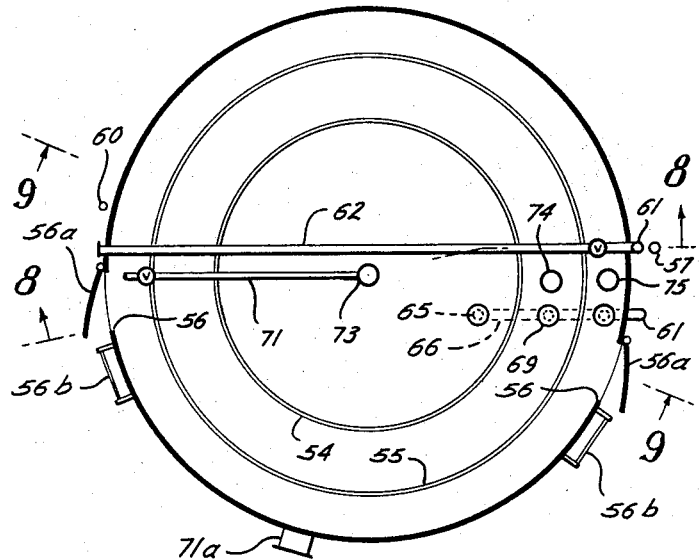
FIG. 7 is a horizontal cross-sectional view through the tank of a fish farm constructed in accordance with the second-mentioned embodiment of the invention.

The embodiment of the invention illustrated in FIGS. 7 and 10 comprises, as in the case of the fish farm 10, an upright, cylindrical tank 50 of fiberglass which is closed at its top and bottom 51 and 52, and has walls 53 extending laterally across its interior to divide it into an upper chamber A and lower chambers B, C, D, E, F, and G. As distinguished from the tank 11 of the fish farm 10, the lower chambers of the tank 50 include chambers B, C, and D which are arranged on substantially the same horizontal level and separated from one another by concentric walls 54 and 55 extending upwardly from the bottom wall 53 beneath the upper chamber A. The remaining lower chambers E, F, and G are in turn arranged vertically beneath the chambers B, C, and D and one below the other, as in the case of the lower chambers of the fish farm 10.

Access is had to each of the lower chambers through openings 56 in the opposite sides of the tank, the uppermost of which provide access to each of the lower chambers B, C, and D. As in the case of the openings into the tank 11, the openings are normally closed by doors 56a pivotally mounted on the tank, and ladders 56b extend along the side of the tank to permit a person to reach the doors on any level.

As in the case of the fish farm 10, means including a pump (not shown) are provided for circulating water into the upper chamber A, from the upper chamber into each of the lower chambers B–G, and from each of the lower chambers back to the pump. Water is delivered from the pump to the upper chamber by means of a vertical conduit 57 connecting the dishcarge side of the pump with a cooling tower 58 mounted on the top 51 of the tank above upper chamber A. The construction and function of the cooling tower is identical to the cooling tower 37 of the first-described embodiment. Water is maintained at a desired level 59 in the upper chamber A by means of a float controlled device 60a which operates a valve to open or close the upper end of a water input conduit 60, again similarly to the manner described in connection with fish farm 10.

Water is conducted from the upper chamber A to each of the lower chambers by conduits including a downpipe 61 connecting at its upper end with the chamber A near its bottom wall 53 and with headers 62 extending into the tank for disposal laterally across the upper portions of the lower chambers. The uppermost header 62 is common to each of the horizontally arranged lower chambers B, C, and D. As in the case of the fish farm 10, jets 63 extend downwardly from ach header for injecting water into each chamber beneath its maintained water level. As can be seen from FIG. 8, the jets are so spaced along the uppermost header that at least some of them are disposed within each of the horizontally arranged chambers B, C, and D.

Water is returned from the lower chambers to the pump by means of conduits including a downpipe 64 and a single pipe 68 leading to a filter (not shown) on the suction side of the pump. The downpipe receives water from level control pipes 65 in the chambers B–F and the single pipe 68 from the chamber G. As in the case of fish farm 10, the pipes 65 are mounted on the lower walls of the chambers and of such height as to maintain a desired water level in the chamber.

Pipes 65 in the chambers B, C, and D connect with a common conduit 66 which extends loosely through an enlarged hole (not shown) in the side of the tank for connection with the upper end of downpipe 64. The pipes 65 of the vertically arranged lower chambers E and F are connected at their lower ends to a laterally extending conduit 67 connected at their lower ends to a laterally extending conduit 67 connecting with successively lower portions of the downpipe 64, and the pipe 65 in the lowermost chamber G connects with a separate pipe 68, which similarly to pipe 22 of fish farm 10, is adapted to connect with the downpipe 64 prior to its connection to the filter.

As in the case of the level control pipes of fish farm 10, each of the pipes 65 is surrounded by an outer pipe 69 mounted on the bottom wall of the chamber and having holes in its lower end to permit excess food and droppings to be swept up from the chamber, through the annulus between the pipes 65 and 69, and downwardly through the pipe 65 for return to the pump by way of the filter.

As in the case of fish farm 10, a valve is located in each of the headers 62 between the downpipe 61 and the jets 63 on the header. This permits selected ones of the chambers to be isolated from the other chambers, whereby they may be separately cleaned and/or harvested. In this particular embodiment, the horizontally arranged lower chambers B, C, and D are isolated as a group from the remaining chambers. However, this does not seriously affect the operation of the farm, inasmuch as it is contemplated that shrimp in the chambers B, C, and D will be of substantially the same size and age, and thus normally harvested at one time.

As shown, a sump 70 is centrally located in the bottom wall of each of the chambers A, B, E, and F, and a drain pipe 71 extends from each sump beneath the bottom wall of the chamber to a position near an opening 56 in the next lower chamber. As in the case of fish farm 10, there is a valve in the drain pipe near its outer end to permit it to be opened for draining the chamber. If desired, holes extending through the walls 54 and 55 may be fitted with removable plugs to permit the chambers C and D to be drained into the chamber B, and thus through the drain pipe 71 from chamber B to the exterior of the tank. Similarly to the lowermost chamber of the fish farm 10, the chamber G may be drained upon removal of a porthole 71a (FIG. 7) in its side near its bottom wall 52.

As distinguished from the fish farm 10, wherein each lower chamber has means for dumping its contents into the next lower chamber, the fish farm of FIGS. 7–10 provides means for dumping the contents of each of the horizontally arranged upper chambers B, C, and D into lower chambers E, F, and G arranged respectively on successively lower levels one below the other. Thus, the chamber B is adapted to be dumped into the chamber E, the chamber C into the chamber F, and the chamber D into the chamber G.

As shown in the detailed view of FIG. 10, the sump 70 in the bottom wall of chamber B has a removable plug 72 which closes its lower end below the inlet to the drain pipe 71. A pipe 73 fits closely into the upper end of the sump 70 and has its lower end located above the inlet to the drain pipe by means of a bar 73a extending across the sump and its upper end of the pipe 73 above the water level, as indicated by broken lines in FIG. 10. Thus, water normally will not flow into the pipe 73, so that it acts as a valve to close the sump until lifted upwardly out of the upper end of the sump. When the pipe 73 is so lifted, water within the chamber B flows into the drain pipe 71 so as to drain the contents of the chamber B upon opening of the valve in the drain pipe. Alternatively, an with the valve in the drain pipe closed, the plug 72 may be removed and the tube 73 lifted from within the sump 70 to permit the contents within the chamber B to be dumped into the chamber E beneath it.

Couplings 70a and 70b extending through the bottom wall 53 of the chambers C and D are adapted to receive the lower ends of removable tubes 74 and 75, respectively, which, as in the case of the tube 73, have upper ends above the water level in such chambers. The lower ends of the coupling 70a and 70b receive the upper ends of extensions 76 and 77, respectively, of the removable tubes 74 and 75. As shown in FIG. 8, the lower end of extension 76 is received in the upper end of a coupling 78 which extends through the bottom wall of chamber E, and the lower end of extension 77 passes through a coupling 79 in the same wall and has its lower end received within a coupling 80 extending through the bottom wall of chamber F. Thus, upon lifting of tube 74, the contents of chamber C are dumped into chamber F, and upon lifting of tube 75, the contents of chamber D are dumped into chamber G.

As indicated in FIG. 8, a conduit 81 connects with the lower end of downpipe 61 for delivering water to the downpipe from a suitable source of water upon opening of a valve 81a disposed therein. Similarly to the valve 49b of the fish farm 10, the valve 81a is normally closed and adapted to open for maintaining water in the chambers upon loss of power for operating the pump.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A fish farm, comprising an upright tank having means providing an upper chamber and a plurality of lower chambers, means including a pump for delivering water to the upper chamber, means for conducting water from the upper chamber to each of said lower chambers, means for returning water from each of said lower chambers to said pump, means for interrupting the delivery of water to selected ones of the lower chambers, and means for maintaining a desired level of water in each of said chambers.

2. A fish farm of the character defined in claim 1, including means for draining water from each of said chambers.

3. A fish farm of the character defined in claim 1, including means for dumping the contents of one lower chamber directly into another lower chamber beneath it.

4. A fish farm of the character defined in claim 2, including means for dumping the contents of one lower chamber directly into another lower chamber beneath it.

5. A fish farm of the character defined in claim 1, wherein said water conducting means includes means for aerating said water as it enters each lower chamber.

6. A fish farm of the character defined in claim 1, wherein at least some of said lower chambers are vertically arranged.

7. A fish farm of the character defined in claim 6, wherein said water conducting means includes a downpipe connecting the upper chamber with each of said vertically arranged lower chambers.

8. A fish farm of the character defined in claim 6, wherein said water conducting means includes a header extending into each of said vertically arranged lower chambers.

9. A fish farm of the character defined in claim 6, wherein the water returning means includes a downpipe connecting with each of said vertically arranged lower chambers except the lowermost thereof, and a separate pipe connecting with said lowermost chamber.

10. A fish farm of the character defined in claim 6, wherein said upright tank also has additional lower chambers arranged on generally the same horizontal level as the uppermost of said vertically arranged lower chambers.

11. A fish farm of the character defined in claim 10, wherein said water conducting means includes a downpipe connecting the upper chamber with said horizontally arranged lower chambers and each of said vertically arranged lower chambers beneath said horizontally arranged lower chambers.

12. A fish farm of the character defined in claim 11, wherein said water conducting means includes a header extending into the horizontally arranged lower chambers and a header extending into each of said vertically arranged lower chambers.

13. A fish farm of the character defined in claim 10, including means for dumping the contents of each of said horizontally arranged upper chambers directly into one of said vertically arranged chambers therebeneath.

14. A fish farm, comprising an upright tank having means providing an upper chamber and a pair of lower chambers arranged one above the other, means including a pump fo delivering water to the upper chamber, means for conducting water from said upper chamber to each of said lower chambers, means for returning water from each of said lower chambers to said pump, means for maintaining a desired level of water in each of said chambers, and means for dumping the contents of the upper of the lower chambers directly into the lower of the lower chambers.

15. A fish farm of the character defined in claim 14, wherein said dumping means includes a sump in the lowermost portion of the upper of the lower chambers, and valve means for selectively opening and closing the sump to the lower of the lower chambers.

16. A fish farm of the character defined in claim 15, wherein the tank has a side opening to the lower of the lower chambers, a drain line extends from the sump to an outer end near the side opening, and there is a valve in the drain line near its outer end.

17. A fish farm of the character defined in claim 15, wherein the sump has a hole in its lower end, and the valve means includes a vertical tube having a lower end fitting closely within the sump and an upper end above the water level in the upper of the lower chambers.

18. A fish farm of the character defined in claim 15, including an arm extending from the valve means to an operating handle.

19. A fish farm, comprising a tank having means providing an upper chamber and a plurality of lower chambers, means including a pump for delivering water to the upper chamber from a first source, means including a downpipe connecting said upper chamber with each of the lower chambers for conducting water from said upper chamber to each of said lower chambers, means for returning water from said lower chambers to said pump, a conduit adapted to be connected with a second source of water under pressure and connecting with the downpipe beneath its connection with the lowermost lower chamber, and valve means in said conduit adapted to open and thus supply said water under pressure to said downpipe in response to inability of said pump to deliver water from said first source.

20. A fish farm, comprising a tank having a chamber therein with a bottom wall extending across the tank, means for introducing water to the chamber, means for draining water from the chamber, a pair of upright, concentric pipes mounted on the bottom wall of the chamber, the outer pipe having holes in its lower end to admit water and small particles to the annulus between the pipes, the inner pipe having an upper end lower than the upper end of the outer pipe to determine the level of water within the chamber, and a conduit fixed to the lower end of the inner pipe for returning water to the pump, the lower end of the inner pipe fixed to and extending through the bottom wall of the chamber, the tank having a side opening therein beneath said bottom wall, and said conduit extending loosely through said side opening to permit said conduit to rise and fall with the bottom wall, during introduction of water into and draining of water from said chamber.

* * * * *